United States Patent [19]

Palusamy et al.

[11] Patent Number: 5,311,562
[45] Date of Patent: May 10, 1994

[54] PLANT MAINTENANCE WITH PREDICTIVE DIAGNOSTICS

[75] Inventors: Sam S. Palusamy, Murrysville; Douglas A. Bauman, Apollo; Thomas A. Kozlosky, Oakmont; Charles B. Bond, Export; Elwyn L. Cranford, III, Greensburg; Theodore J. Batt, Penn Hills, all of Pa.

[73] Assignee: Westinghouse Electric Corp., Pittsburgh, Pa.

[21] Appl. No.: 983,935

[22] Filed: Dec. 1, 1992

[51] Int. Cl.$^5$ .................................................. G21C 7/36
[52] U.S. Cl. .................................. 376/215; 376/216
[58] Field of Search ................................. 376/215, 216

[56] References Cited

U.S. PATENT DOCUMENTS

| | | | |
|---|---|---|---|
| 4,803,039 | 2/1989 | Impink, Jr. et al. | 376/216 |
| 4,853,175 | 8/1989 | Rook | 376/216 |
| 4,908,775 | 3/1990 | Palusamy et al. | 364/508 |
| 4,935,195 | 6/1990 | Palusamy et al. | 376/249 |
| 4,961,898 | 10/1990 | Bogard et al. | 376/245 |
| 5,009,833 | 4/1991 | Takeuchi et al. | 376/216 |

FOREIGN PATENT DOCUMENTS 0411873  6/1991  European Pat. Off. ...... G06F 15/60

OTHER PUBLICATIONS

Westinghouse Plant Monitoring and Diagnostics System (undated).

Primary Examiner—Donald P. Walsh
Assistant Examiner—Frederick H. Voss
Attorney, Agent, or Firm—J. C. Valentine

[57] ABSTRACT

An integrated information system is provided for a plant with interactive processes running in functional equipment subsets, such as a nuclear power generation plant. Sensors are operatively coupled to monitor processes and equipment in the plant, collecting sample data for assessing operational conditions and for predicting maintenance requirements based on loading of the equipment. One or more processors access the sample data and compares present conditions to diagnostic specifications, technical specifications and historical data stored in memory and indexed to equipment subsets and functional operating groups. The processor(s) generate prioritized reports to alert users to potential operational and/or maintenance problems. In addition to the prioritized reports, the processor accesses and outputs to the users reports of the diagnostic and technical specifications applicable to the process parameters exhibiting the potential problems. These specifications are provided in successive levels of detail and are cross referenced between related processes and related items of equipment. The information system integrates operations, maintenance, engineering and management interests in a common database of information via network-coupled data terminals.

7 Claims, 8 Drawing Sheets

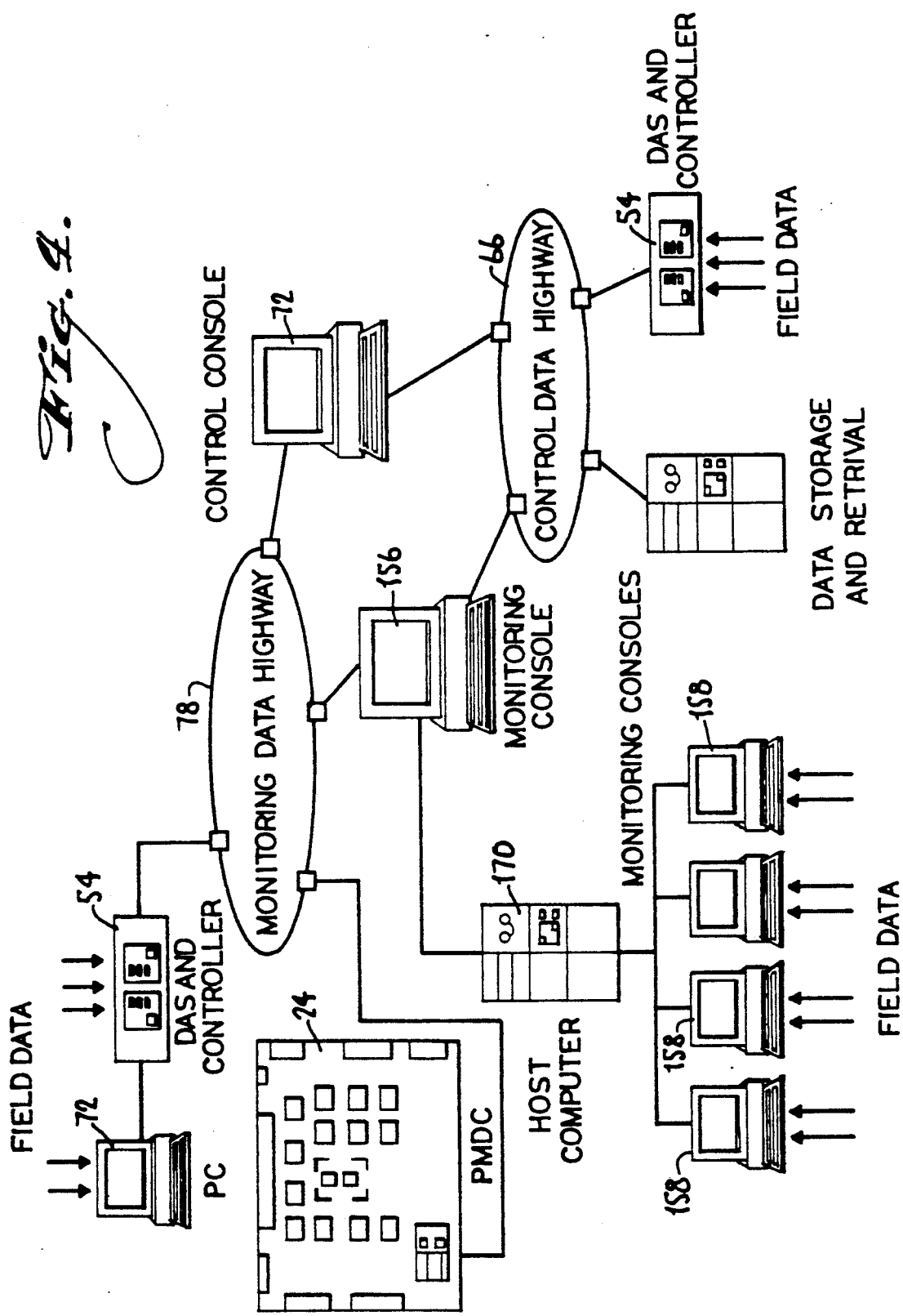

| NPDMS | | | PLANT NAME |
|---|---|---|---|
| | | DIAGNOSTIC SUMMARY | UNIT NO |

DIAGNOSIS RECEIVED MONTH-DAY-YEAR    TIME

| NO | CF | REC. AVAIL. | CONDITION  [ 3 DIAGNOSES ON MAINTENANCE LIST ] |
|---|---|---|---|
| 1. | 0.99 | Y | Incorrect stem packing tightness on VALVE # 870la |
| 2. | NA | Y | Thermal stratification in RHR exceeds level 1 limits |
| 3. | 0.80 | Y | Malfunctioned incorrect setting of seal oil valve #256 |
| 4. | 0.78 | Y | Stator winding E-T baskets are progressively loosening |
| 5. | NA | Y | Fatigue usage of PRZ Surge Nozzle reached 60% allowable |
| 6. | NA | Y | Pressurizer cooldown rate limit of 200 Deg Hr exceeded |
| 7. | 0.71 | Y | Regn. Hx outlet temperature sensor (TE-126) is suspect |
| 8. | NA | Y | Reactor vessel cooldown rate high at 80% of allowable limit |
| 9. | NA | Y | Reactor trip cycles at 80% of the allowable limit |
| 10. | 0.55 | Y | Loss of Reactor Vessel Core Barrel Axial Restraint |
| 11. | 0.73 | Y | Uneven temperature profile in Reactor Vessel T.M.I. |

Move cursor or mouse to highlight diagnosis of interest and choose from below:

Thermal stratification in RHR exceeds level 1 limits

| F1 DSC MAIL | F2 DIAGNOSE | F3 GUIDANCE | F4 ACTION | F5 | F6 | F7 PLNT I&C | F8 REPLY |

Fig. 5.

| NPDMS | EXPLANATION & RECOMMENDATION | PLANT NAME UNIT NO. |

DIAGNOSIS: Thermal stratification in RHR exceeds level 1 temp limits
— 124

DESCRIPTION: Thermal stratification in RHR system is likely the result of leakage through valve 8701A. The magnitude of this stratification is based on the difference between the 0-degree and 180-degree temperature readouts. Level 1 temperature limits require that further evaluation be performed on the temperature traces.

CONSEQUENCE OF INACTION: — 126
If this condition is not corrected and thermal cycling develops, then excessive fatigue loading of pipe and valve pressure boundary may result in pipe cracking and eventual leakage.

RECOMMENDED ACTION:
1) Check possible root cause of leakage and correct at next available outage. Most likely source is valve 8701A.
2) Evaluate temperature traces for structural integrity issues.
— 128

| F1 DSC MAIL | F2 DIAGNOSE | F3 GUIDANCE | F4 ACTION | F5 | F6 | F7 PLNT I&C | F8 REPLY |

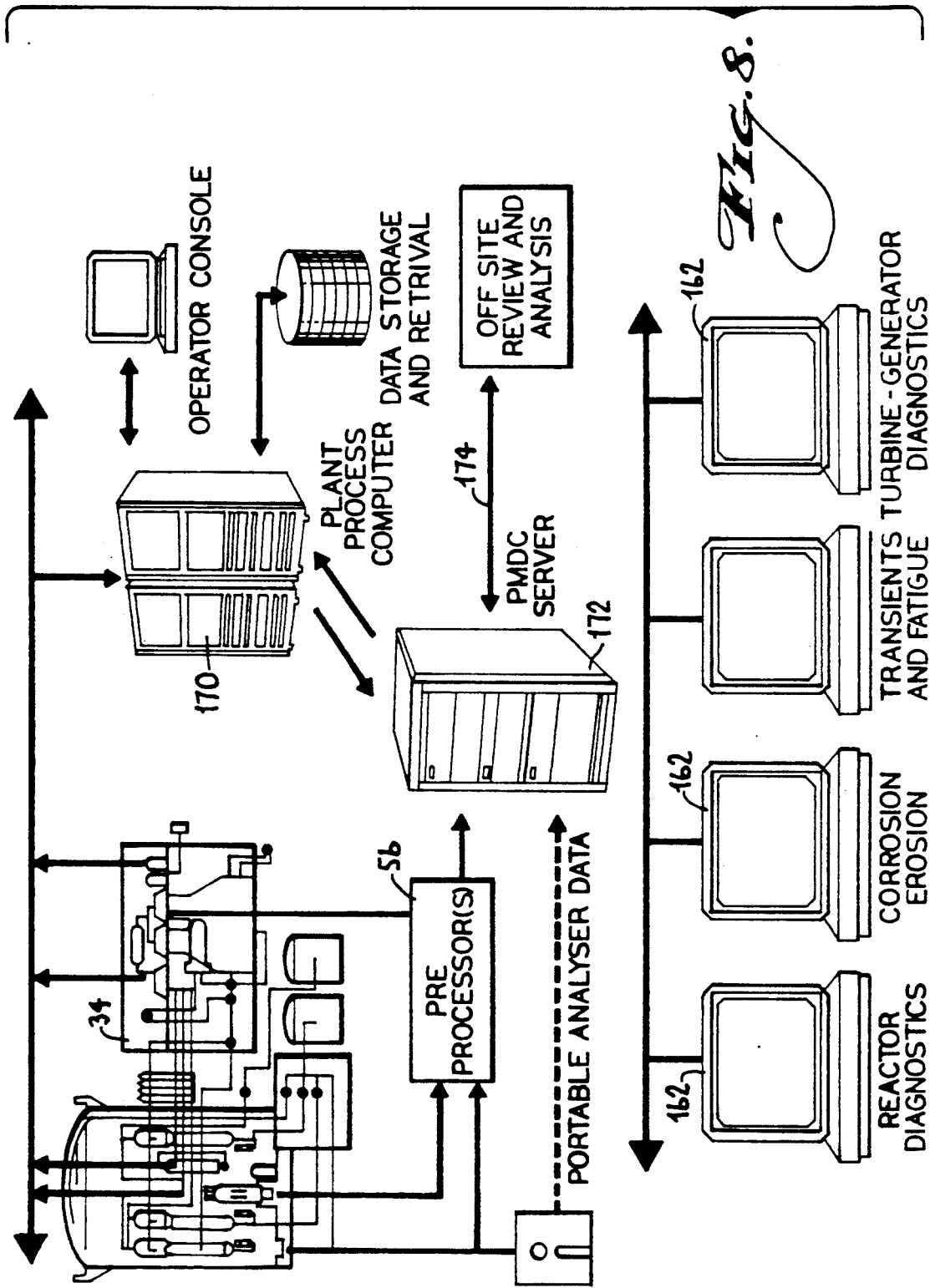

PLANT MAINTENANCE WITH PREDICTIVE DIAGNOSTICS

BACKGROUND OF THE INVENTION

1. Field of the Invention

The invention relates to the field of plant control and management information systems, and in particular to an integrated plant monitoring and diagnostic system for shared use by the operations, maintenance and engineering departments of a nuclear power plant. The system collects and monitors operating parameter data via sensors, generates prioritized condition reports including present conditions and anticipated impending conditions to be addressed by preventive maintenance or operational changes, and provides users with background technical and historical data that is ranked and cross referenced by related operational systems and related articles of equipment.

2. Prior Art

Various management information systems are known for monitoring and recording process parameters in connection with power generation as well as with industrial processes generally. These systems often are reactive in that they respond to present levels of monitored parameters, or at most respond to present trends to control generation of alarms and the like when a parameter exceeds preset values or threatens to do so. A typical process control system monitors sensed parameters to ensure that they remain within preset limits defined by the programmer of the system. Often the present levels can be displayed graphically to highlight trends.

Another form of management information system is known in connection with scheduling of maintenance procedures. By defining a useful life for each article of equipment among a number of articles which are related or inter-dependent, it is possible to schedule repair, replacement or preventive maintenance operations more efficiently so as to minimize downtime. The idea is to plan replacement or repair of articles of equipment for as late as practicable before an actual failure, preferably using intelligent scheduling procedures to minimize downtime by taking maximum advantage of any downtime. The scheduling system prompts or warns plant personnel to attend to each of the articles which may need attention at or soon after the time at which the maintenance of any particular article becomes critically important.

U.S. Pat. No. 4,908,775—Palusamy et al discloses a cyclic monitoring system which counts down a defined useful life expected for various structures in a nuclear power plant. This system is responsive to operating levels in the plant, and increases the predicted aging rate of plant structures to account for variations in usage including transient loading. A sampling module is provided to detect the current loading of monitored equipment periodically. Transient and steady state operating levels are determined from the sampled data and used to generate a usage factor. Equipment degradation due to fatigue and the like is anticipated by integrating the usage factor over time. Whereas operating levels and transient disturbances are taken into account in assessing the wear on plant equipment, the system can be used to plan maintenance and replacement activities or alternative plant operations, using a more accurate estimation of the useful life of the plant components.

The predictive maintenance system according to Palusamy '775 incorporates both operational data and a defined useful life data indexed to articles of equipment. However, the system is such that it primarily serves only maintenance functions. It would be advantageous to provide a system that benefits operational and engineering departments as well. The present invention is intended to accomplish this by integrating not only information regarding usage and expected useful life, but by further integrating design and technical specifications and historical data into a system that monitors operational levels as well as equipment conditions. This data is provided in a hierarchical data acquisition and processing system providing shared access by the different departments, especially operations, maintenance and engineering. The data is arranged and cross referenced for presentation of meaningful reports for each of the departments.

Nuclear reactors for generation of electric power are heavily instrumented to enable efficient plant operation and to ensure safety. U.S. Pat. No. 4,961,898 Bogard et al discloses a system operable to record and report neutron emission levels in and around the reactor as well as pressure and flow parameters, for accurately assessing the accumulation of stress on the operating structures. U.S. Pat. No. 4,935,195—Palusamy et al similarly attempts to factor corrosion of the coolant flow path structures for assessing the useful life of reactor components.

Typically, monitoring equipment for a nuclear power plant or similar process is associated specifically with a particular structure or operating system of the plant. For example, in Bogard et al the monitoring system is specifically associated with coolant flow structures. In Palusamy '195 the monitoring system is associated with the neutron emissions. For the most part, monitoring systems of this type are dedicated either to safety purposes (e.g., to detect an unsafe condition and to shut down and/or generate alarms automatically), or to operational control (e.g., to control the positions of valves and the like during ongoing plant operation). Routines which accumulate a usage factor for assessing the loading factor on a particular subsystem could use much of the same data which is collected by safety and control instrumentation. However, the prior art fails to provide a fully integrated system that can take full advantage of the available instrumentation.

It would be advantageous to provide such an integrated system which not only monitors various articles of plant equipment, but which also accounts for the interdependence of the subsystems, makes decisions or predictions in view of stored design criteria, and makes all this information available generally to plant personnel. In specifying the subsystems, design criteria and technical specifications were merged under the assumption that the subsystems would operate under certain conditions. Operational conditions such as equipment problems can change the loading level for a given article of equipment or subsystem, and also the loading levels of other articles and subsystems that are related to or interdependent with the given ones. Therefore, the interrelations of the articles or subsystems, their design specifications, their history and their current conditions should all be taken in account when assessing operational conditions and maintenance needs, or when evaluating operations on an engineering level.

It is generally advisable for plant management and/or maintenance personnel to collect any available data regarding the subsystems operating in a plant or in an area of the plant, to coordinate maintenance and repair activities. In this manner, a downtime for work on one or more articles or subsystems can be used for simultaneous work on others. However, a comprehensive calculation and analysis of relevant plant conditions can be lengthy and costly. In a monitoring system where information on operational conditions is only immediately available to the operators (e.g., for safety and/or control purposes), engineers, scientists, maintenance technicians, managers and headquarters staff must collect and analyze much of the same information in planning their activities. Each group tends to collect and analyze data in a manner that is best suited to their own area of concern. Nevertheless, an integrated arrangement is certainly more efficient and useful than one in which the various departments operate substantially independent information systems.

The present invention is intended to integrate diagnostic and predictive instrumentation for a number of interdependent plant systems, for taking advantage of available synergies. Furthermore, safety and control parameters are collected using a data network arrangement that is shared by primary and auxiliary system control and protection groups, plant maintenance groups, plant engineering and management. In order to accomplish this objective, the plant computerized information system is integrated generally with instrument data collection from a variety of sources, and stored design criteria information. The operational parameters are factored together in an integrated diagnostics and monitoring system with technical specifications for condition directed maintenance and aging management. Specific, actionable diagnostic information on equipment condition is developed, including cross referenced selection of background technical data, whereby operations and maintenance decisions can be made more effectively and from a greater base of knowledge.

The diagnostics and maintenance arrangement according to the invention puts control and safety parameter information to use by the engineering and maintenance departments rather than only the operations control personnel. Conversely, the system makes maintenance and engineering information available to operations and safety groups, thus providing various useful lines of communication and data access availability.

SUMMARY OF THE INVENTION

It is an object of the invention to integrate operational parameter data collection, evaluation based on stored design criteria, and plant information reporting, in a comprehensive plant information system useful for planning operational and maintenance decisions.

It is another object of the invention to make pertinent information readily available for use not only by plant operators, but also generally by engineers, scientists, maintenance technicians, managers and headquarters staff.

It is more particularly an object to collect a wide array of information respecting the character and operational conditions of functionally interdependent elements of a nuclear power generation plant, including design criteria applicable to the elements, and to process this information using intelligent monitoring and diagnostic routines that model operation of the plant to anticipate problems and enable efficient planning of operations and maintenance.

It is another object of the invention to define the overall architecture and operation of a plant information system according to these objects, which is best suited to take advantage of technology advancements as well as available data collection devices, processing apparatus, degradation types and diagnostic methodologies.

These and other objects are accomplished by an integrated information system for a plant with interactive processes running in functional equipment subsets, such as a nuclear power generation plant. Sensors are operatively coupled to monitor processes and equipment in the plant, collecting sample data for assessing operational conditions and for predicting maintenance requirements based on loading of the equipment. A processor accesses the sample data and compares present conditions to diagnostic specifications, technical specifications and historical data stored in memory and indexed to equipment subsets and functional operating groups. The processor generates prioritized reports to alert users to potential operational and/or maintenance problems. In addition to the prioritized reports, the processor accesses and outputs to the users reports of the diagnostic and technical specifications applicable to the process parameters exhibiting the potential problems. These specifications are provided in successive levels of detail and are cross referenced between related processes and related items of equipment. The information system integrates operations, maintenance, engineering and management interests in a common database of information via network-coupled data terminals.

BRIEF DESCRIPTION OF THE DRAWINGS

There are shown in the drawings certain exemplary embodiments of the invention as presently preferred. It should be understood that the invention is not limited to the specific examples, and is capable of variations within the scope of the appended claims. In the drawings.

FIG. 4 is a schematic illustration of data pathways for monitoring and control functions.

FIG. 5 is a schematic illustration of a networked installation of terminals sharing access to commonly collected and stored information.

FIG. 6 is a tabular display of actionable directives generated by a preferred embodiment in response to detected conditions.

FIG. 7 is a tabular display of exemplary cross referenced technical specifications referring to certain of the directives provided in FIG. 6.

FIG. 8 is a schematic illustration of an exemplary system architecture according to the invention, as applied to a nuclear power generation plant.

DETAILED DESCRIPTION OF THE PREFERRED EMBODIMENTS

Figure 1:
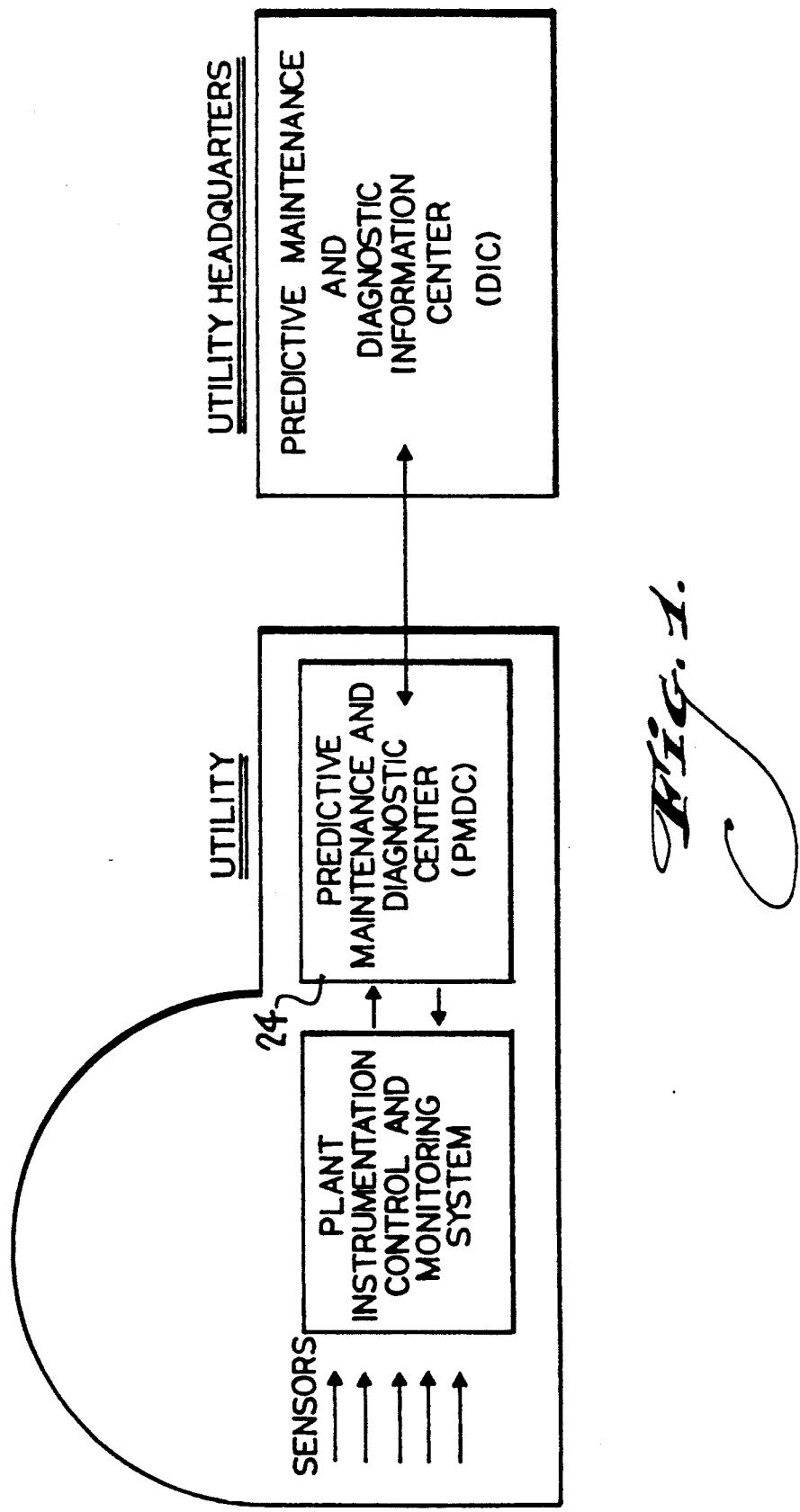
FIG. 1 is a block diagram illustrating generally a plant information system integrating operation, control, protection, engineering and maintenance information according to the invention.

The invention is applicable to a variety of industrial processes wherein data respecting process parameters is collected and reported to enable management decision making. A particularly apt application of the invention is to a nuclear power generation plant. A nuclear plant is normally highly instrumented for collecting information needed to operate at peak efficiency, as well as to tightly monitor operation for safety reasons. The signals developed by sensors for flow, temperature, pressure, valve status, nuclear particle flux levels and the like are to some extent coupled into operational circuits which are intended to effect control operations. According to the invention, sensor signals are coupled to a plant instrumentation control and monitoring center 20 that as shown in FIG. 1 is further coupled to a predictive maintenance and diagnostic center 24.

Information required for pertinent diagnostic information according to the invention includes design criteria applicable to the plant. For example, should a certain valve, flow element, heat transfer device or rotating machine be specified as having an estimated useful life when operated at a particular level of demand, pertinent diagnosis of the element requires that the remaining useful life be decremented as a function of the demand level. Accordingly, the predictive maintenance and diagnostic center is coupled to a diagnostic information center which makes such information available. In the embodiment shown in FIG. 1, the information center 20 is shown as a separate location in data communication with the plant-located predictive maintenance and diagnostic center 24. This is an efficient arrangement where the utility company may have a number of plants which share design aspects. However, the particular location of the respective data storage and computing systems can be varied provided the information is available to each of the processors which need the information.

Figure 2:
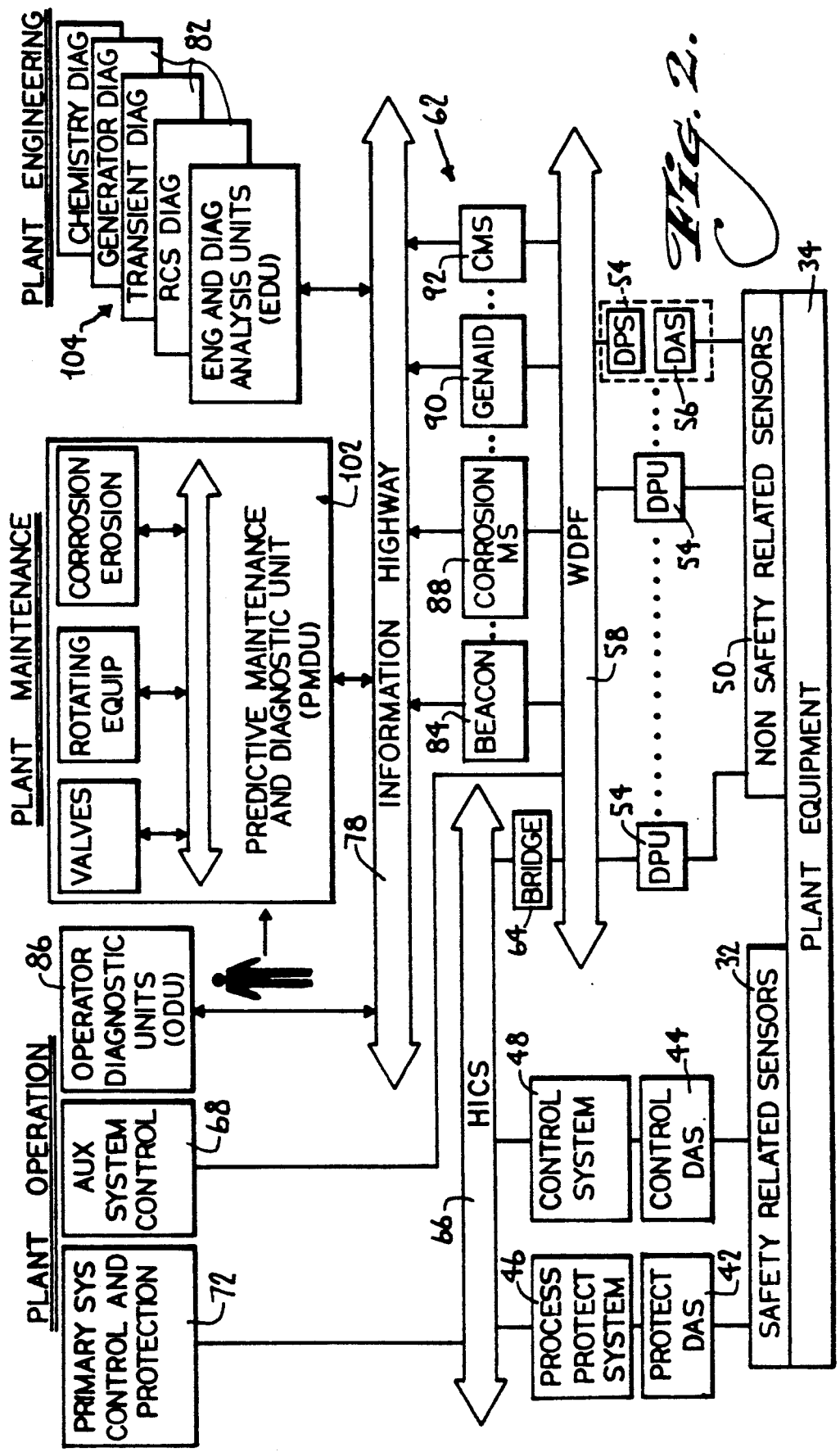
FIG. 2 is a block diagram of the invention showing modular elements of the invention and the data collection and communication links between the elements.

Referring to FIG. 2, plant operational functions, maintenance functions and engineering functions are all integrated to a common network of information stored, collected and otherwise developed according to the invention. Both operational and safety related sensing and information collection are provided, and made available generally to operations, maintenance and engineering stations and/or users. The system can be physically arranged in a control center setup as shown, for example in FIG. 3, or can be accessed from distributed terminals in various areas of the plant or located remotely as in FIG. 4.

As shown in FIG. 2, the system preferably is based on a hierarchical system of data paths, including interconnections that allow data access without interfering with crucial operations. Safety related sensors 32 coupled to the plant operational elements 34 are sampled using a protective data acquisition system 42 and a control data acquisition system 44, which are separate and parallel. A process protection system 46 and operation control system 48 are coupled respectively to the protective and control data acquisition systems 42, 44. These elements are subject to certain inputs from the primary control and protection station(s) coupled to the protection and control systems through an integrated control system forming a kind of bus wherein operational and safety associated parameters are available to both the control and protection systems. However, the control and protection systems have a number of automatic aspects intended to control the plant to achieve process objectives such as efficient complementary setting of valves and the like as well as the capability of automated shutdown without operator intervention in the event of a safety threat.

Sensors 50 which are not directly safety related (but whose data may have implications with respect to operations, safety and control), are coupled to respective data processing units 54, which are coupled to data acquisition means 56 for collecting and reducing the data. The data processing units can collect sample data from one or a plurality of sensors 32, 50, reject data which is impossibly out of limits, and attend to numerical and/or graphical analyses such as average and standard deviation, peak level identification and the like. Data collected from the nonsafety related sensors 50 can be shared over a distributed processing communication path 58 such as the Westinghouse WDPF distributed processing family. In addition, the data processing units 54 are in communication with a number of monitoring systems 62 over the WDPF data pathway 58. Monitoring systems 62 selectively process available data in order to effect specific functions.

Proceeding from left to right over the WDPF 58 in FIG. 2, an interface or bridge element 64 couples the integrated safety/control system data pathway 66 with the WDPF data pathway 58. The bridge 64 permits data to pass between the integrated safety/control pathway 66 and the WDPF 58 in either direction, but is arranged to allow the integrated safety/control system bus 66 to operate regardless of the condition of the WDPF 58. For example, a failure of an element associated with the WDPF such as a power supply, data processing unit or even a line driver or similar element required for operation of the WDPF, cannot affect operation of the integrated safety/control system due to its isolation via the bridge interfacing element 64.

An auxiliary system control unit 68 is also coupled to the WDPF 58, enabling plant operations personnel to monitor data collected over the WDPF and preferably to control operation of the data processing units 54 from plant operations consoles 72. The auxiliary system control unit 68 is coupled to the data processing units 54 (and thus to the non-safety sensors 50) relatively directly through the WDPF 58. The WDPF data pathway is arranged for communication of data from the sensors 50, 32 to plant operations such that individual variables can be examined. However, in addition, the WDPF data is coupled through the intermediate processing systems 62 to a higher level data pathway identified in FIG. 2 as information highway 78. These intermediate processing systems 62 permit the application of higher level long and short term analysis for converting, e.g., a substantially database form of data collected by the data processing units 54 into more sophisticated statistical analyses, trend analyses and correlations that additionally use data stored in the respective intermediate processing systems 62. The modules of the intermediate processing systems 62 report to any and all of the plant operations consoles, plant maintenance personnel and plant engineering personnel. The same information highway 78 can be coupled to additional users via known networking arrangements, telephone line modem pathways and the like.

The intermediate modules 62 represent systems that can be arranged as processing terminals on a data communication network or concurrently operative routines in a larger and more sophisticated data processing system. The function of the intermediate processing units 62 is to select and analyze data available in a relatively less processed form on the WDPF 58, and to provide information which relies on the values and trends identified in the individual process parameters and in selected groups of related parameters. The output of the intermediate modules 62 is reported to users via diagnostic packages 82 tailored to the needs of the operations, maintenance and engineering departments, respectively. A given department such as maintenance or operations normally at least sometimes requires information from different ones of the intermediate modules 62, and the departments thus share the information relating to the process parameters.

A first intermediate processing module, identified in FIG. 2 as the beacon module 84, is arranged to monitor and report present operating parameters. Present operating parameter information affects not only operations decisions, but also is pertinent to maintenance (e.g., whether a subsystem is in use or available for mechanical work, whether a subsystem is being stressed, etc.). The same information is useful to engineering (e.g., to study the overall condition of the plant or interactions between process parameters). An operator diagnostic advisory unit 86 is coupled to the information highway for the primary purpose of collecting and usefully analyzing, storing and reporting upon operations. The operator diagnostic unit 86 can be arranged to run constantly, reporting information respecting diagnostic information and recommending or suggesting operational changes that may affect or alleviate operational problems or potential problems which may occur.

In addition to the beacon intermediate monitoring system 84 and the operations diagnostic unit 86, a corrosion monitoring system 88, a generator monitoring system ("GENAID") 90 and a transient/fatigue cycle monitoring system ("CMS") 92 operate to selectively analyze data collected by the data processing units and made available as process parameter data over the data highway. This information is also potentially useful in connection with operations, maintenance and engineering decisions. The intermediate processing units 62 are devoted to certain aspects of tasks which affect decisions in all these departments, but are organized in a manner that is not limited to one department. Instead, each of the intermediate processing units serves a particular data set. The data needed by the intermediate processing modules 62 may overlap with data needed by others of the intermediate processing modules, and preferably is broken down into the beacon 84 for present operational conditions, corrosion monitoring 88 for long term deterioration due to ambient conditions such as radiation and chemical conditions, generator analysis (GENAID) 90 for thermodynamic and coolant flow analysis, and transient pressure and flow variation monitoring 92, to assess fatigue.

A predictive maintenance and diagnostic unit 102 is also coupled to the information highway 78, for diagnosing and reporting maintenance problems, and a series of engineering diagnostic units 104 are included. The maintenance diagnostic system 102 is preferably organized in a manner that is most meaningful to maintenance personnel, for example referring to individual pieces of plant equipment instead of functional aspects of the process. However, the maintenance diagnostics are preferably arranged to group devices whose operation has an impact on other devices according to functional groupings as well. Preferably, the plant maintenance diagnostic systems are grouped to provide for analysis of categories such as mechanical devices including valves, rotating machines and the like (which may be subject to frictional problems), and pressure/flow conduits (for corrosion/erosion problems).

Similarly, the plant engineering departments use the information available on the information highway 78, as collected by the data processing units 54 and reduced by the intermediate processors 62. A variety of engineering and diagnostic routines 104 are preferably included, for example grouped for residual coolant system diagnosis, transient diagnosis of pressure, flow and/or electrical loading, generator diagnosis and chemical/nuclear diagnosis. These diagnostic processes are related to operational parameters (like the plant operations diagnostics) and also t specific apparatus (like the maintenance diagnostics), and are presented in a format which is tailored to engineering planning as opposed to operations or maintenance procedures.

A major benefit of integrating data collection and reporting according to the invention is that data need not be collected and analyzed redundantly. Nevertheless, the users of the system can retain the benefit of graphic user interfaces with which users may already using (e.g., in connection with analysis of the operation of subsystems having dedicated monitoring systems.). Although the data collection is common to each of the plant departments, specialized mathematical models, xpert "intelligent" analysis and neural networking are readily achieved.

The invention is particularly applicable to operational, maintenance and engineering functions in a nuclear power plant. Such a plant has a variety of apparatus which can be grouped functionally, and which affect one another in the operational and maintenance procedures and decisions undertaken in the plant. A key input to any decision related to life extension of a nuclear plant is the condition of the plant systems and components critical to the safe, reliable and economical operation of that plant. This means not only the current condition, but the condition predicted throughout the remainder of the plant operation. To establish this effectively, at least two things are needed:

Data on critical parameters related to equipment condition; and,

Engineering decision making capability in terms of evaluating available data, namely extraction, saving and use of monitored data to determine current conditions as well as to predict future conditions and make recommendations on actions needed to attain plant objectives.

Certain applications benefit from simply adding raw data to meet the first requirement. However a typical nuclear plant has extensive existing instrumentation providing abundant data. What is more lacking is an optimal means cohesively to use that data for the second requirement, i.e., engineering decision making. The emphasis in the data interface packages developed for nuclear power plants has been an the needs of the operator and his minute-by-minute needs for operations decisions.

The second requirement is met according to the invention by:

Accessing and supplementing the available plant data;

Establishing evaluation objectives (critical components, associated measures of degradation, criteria and limits, etc.); and, Implementing a capability to evaluate the data and make recommendations.

Of course the system of diagnostics and monitoring must be cost justified. The relative costs of various maintenance approaches (corrective, preventive, predictive) over the plant life are such that a factor of two improvement in cost can be achieved by using a predictive approach to maintenance instead of traditional approaches.

It is an aspect of the invention that the diagnostic and monitoring functions are integrated, for example into a plant process computer and instrumentation system architecture. In this sense, the plant process computer can include one processor or any number of processors in data communication, for example over the network communication paths described. The architecture of the invention relates to the arrangements and interconnections which link inputs to the process, the defined or required characteristics of the process itself, and the resulting outputs from the process. For the case of a nuclear plant diagnostics and monitoring system, the types of data needed include process parameters, control and response data, and preferably accumulated historical data. This information is obtained from plant instrumentation, distributed plant computer systems, additional sensors which may be unrelated to safety and control systems, test and performance data (whether measured, stored from previous measurements or specified for the equipment) and mainframe data storage. Such data may be stored as to any appropriate frequency of measurement, from milliseconds to years, and may be reduced into the form of average and standard deviation over selected periods or may include raw samples.

The type of available data and the required output define the type and frequency of data processing steps needed to convert the available data into meaningful presentations, and to sift through the available data to detect conditions which should generate a diagnostic warning. One or more processors associated with the hierarchy provide the data processing power and data storage capabilities needed to effect timely calculations on a real-time, automated periodic and/or on-demand basis.

The calculations undertaken by the processor(s) are of the type used in monitoring subsystems for the respective plant components; however, according to the invention the calculations are not limited to input based upon current parameter values in an isolated subsystem. Accordingly, diagnostic routines applicable to a subsystem, as undertaken by the integrated diagnostic and monitoring system, are affected by the conditions in related subsystems. The specific calculations can be mathematical algorithms, logical rule based (as in fuzzy logic) or neural network processes involving a multidimensional chain of calculations and decisions. The calculations can also include statistical analyses and database management type processes.

Output data is to be used to alert operators to conditions which may become critical shortly or not for a long time, and preferably also enable general monitoring as to what is going on in the plant. Accordingly, the output is preferably generated in forms including on-screen graphic and tabular data displays, storage of data on disk, tape or hardcopy, as well as audio and/or video signalling. In addition to selection of data from the inputs or from first or second level information generated from the inputs, the output data includes diagnostic information for monitored devices and subsystems, recommendations for action which are selected based on the diagnostic information and plant conditions, and additional backup information about the devices and subsystems (such as their physical characteristics, ratings and the like), from which the operators can discern the basis of the diagnosis and recommendations.

The users of the output generated by the system include most types of plant personnel. General categories of users include the operations support staff, maintenance, engineering and scientific staff, and plant management. Outside of the plant, headquarters engineering and management staff preferably have access to the data, and it is even possible to allow vendors access in order to enable them to assess the conditions under which requested equipment is to operate, or to assess the present conditions applicable to equipment already supplied. Under such conditions the vendors may be aware of an aspect of the equipment that should be made known for diagnostic purposes.

Insofar as users remote from the processor generating the output data may be coupled to the processor, various high speed and low speed data communications links can be employed. Such users may be on-site or off-site, and are coupled in data communication with the processor by hardwire, modem, radio or fiber optic links, as required in view of the data capacity needed.

For output and display, utility personnel need specific diagnoses of critical aspects of plant condition. According to the invention, such critical aspects are ranked and prioritized in a tabular display 110 from which the user can select further information on the diagnosis, the recommended corrected action, and background information on the affected structural elements and/or plant subsystems. The current status of the plant must always be available and easily accessible. A sample of a tabular display of diagnostic considerations in summary form appears in FIG. 5.

Figure 7:
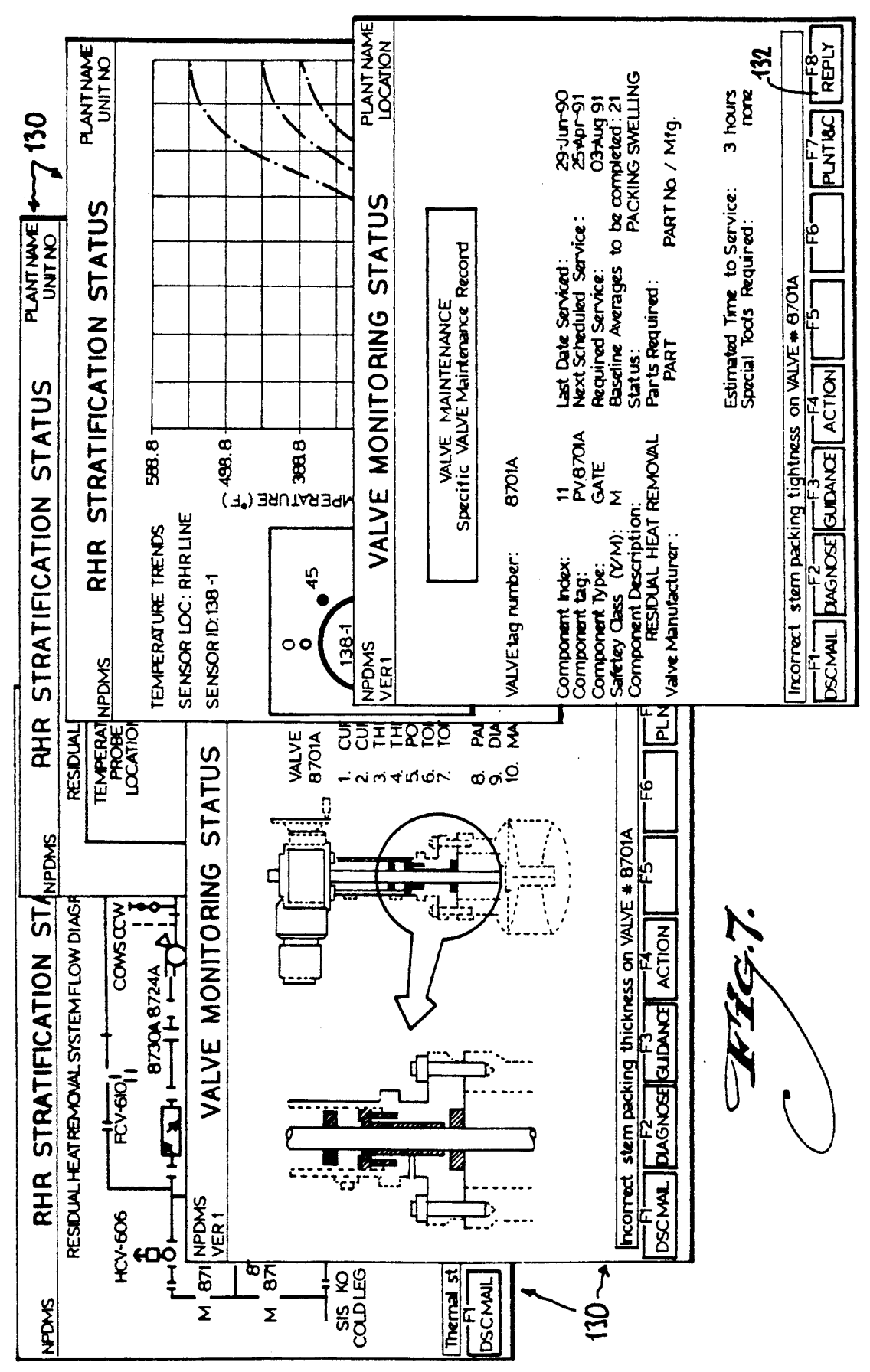

In the example shown, there are a number of conditions 114 rated by priorities 116. The list includes conditions which represent reactor status or operational information, and some suggesting a need for maintenance. Based on preprogrammed relationships between components of the plant, operations and maintenance personnel can react as appropriate. FIGS. 6 and 7 are examples of backup information respecting the items mentioned in the diagnostic summary. In the example, a valve identified as 8701A is described as having an incorrect stem packing tightness. Based only on the information on the summary, the implications of incorrect stem packing tightness in the particular valve may be unclear. However, the diagnostics summary 110 is a gateway to additional information describing the valve, and in fact also includes reactor operational information which likewise identifies the valve as an element in need of attention.

Item 2 on the diagnostics summary states that thermal stratification in the residual heat removal (RHR) system exceeds level 1 limits, level 1 being a minimum warning threshold. By selecting item 2, the operator is provided with background information 120 on RHR thermal stratification conditions. The backup information as shown in FIG. 6, includes a longer explanation 124 of the problem, a description 126 of the consequences of inaction, and recommendations 128 for activities which may fix the problem. In the example, the explanation identifies valve 8701A as the likely culprit, suggesting that the valve may be leaking. In conjunction with the diagnostics summary, the user is led immediately to the cause of the problem and can readily assess the severity thereof.

The residual heat removal system is an operating subset of the reactor, and preferably a series of tabular, graphic and text screens can be selected by paging through the respective levels of diagnosis. FIG. 7 illustrates further informational screens 130 under the groupings of RHR Stratification Status, and also Valve Monitoring Status, which are alternative cross referenced paths leading to a resolution of the problem shown in the summary 110. The screens applicable to RHR Stratification include the subject valve, and the screens relating to valve monitoring mention the function of the subject valve. By proceeding through the screens and selecting cross referenced information it is possible to obtain a full picture of the situation.

Preferably, the diagnostic system includes means 132 for the user to acknowledge receipt of the recommendation. In this manner the system ensures that appropriate attention is paid by those people who can act on the recommendation, and one person does not assume that another is taking responsibility for attending to the recommendation. Acknowledgement, as well as moving between screens, can be effected using any convenient input means such as a keyboard, mouse, touch sensitive screen input or the like.

According to the invention, the recommendation reported to the responsible parties, permits access to detailed component data, historical operations and maintenance information, and other data that is readily accumulated due to the integration of the system. Any data that is helpful or necessary to effectively interpret the recommendation, to plan an implementation, and to interact with other affected plant groups can be included.

FIGS. 5-7, as an integrated whole, illustrate a graphic interface useful to plant users which enable the user to evaluate and act on a particular diagnosis at progressively deeper information levels, and with respect to cross referencing between component groupings and between operational and maintenance considerations. The example discussed above with respect to the RHR Stratification relates to diagnostic and monitoring functions. It will be appreciated that cross references between operational or maintenance functions and those of engineering or management can be organized in a similar manner. The specific calculations necessary to obtain the required output, and the required input to derive the calculations, are apparent to those skilled in the art.

The integrated input, output and display particulars useful to various plant and utility technical and managerial groups, are similar to an operational control center, and the predictive maintenance and diagnostic center of the invention uses an operational or control center approach to meet the needs of engineering, and operations and maintenance personnel. A difference is that the operational or control center for maintenance and diagnostics is linked not only to a wide variety of process inputs and sets of data generated from process inputs, but is also linked to information defining the plant and the design characteristics of the apparatus and processes employed in the plant. This linking is accomplished though the predictive maintenance and diagnostic routines that are integrated into the system as a whole.

Figure 3:
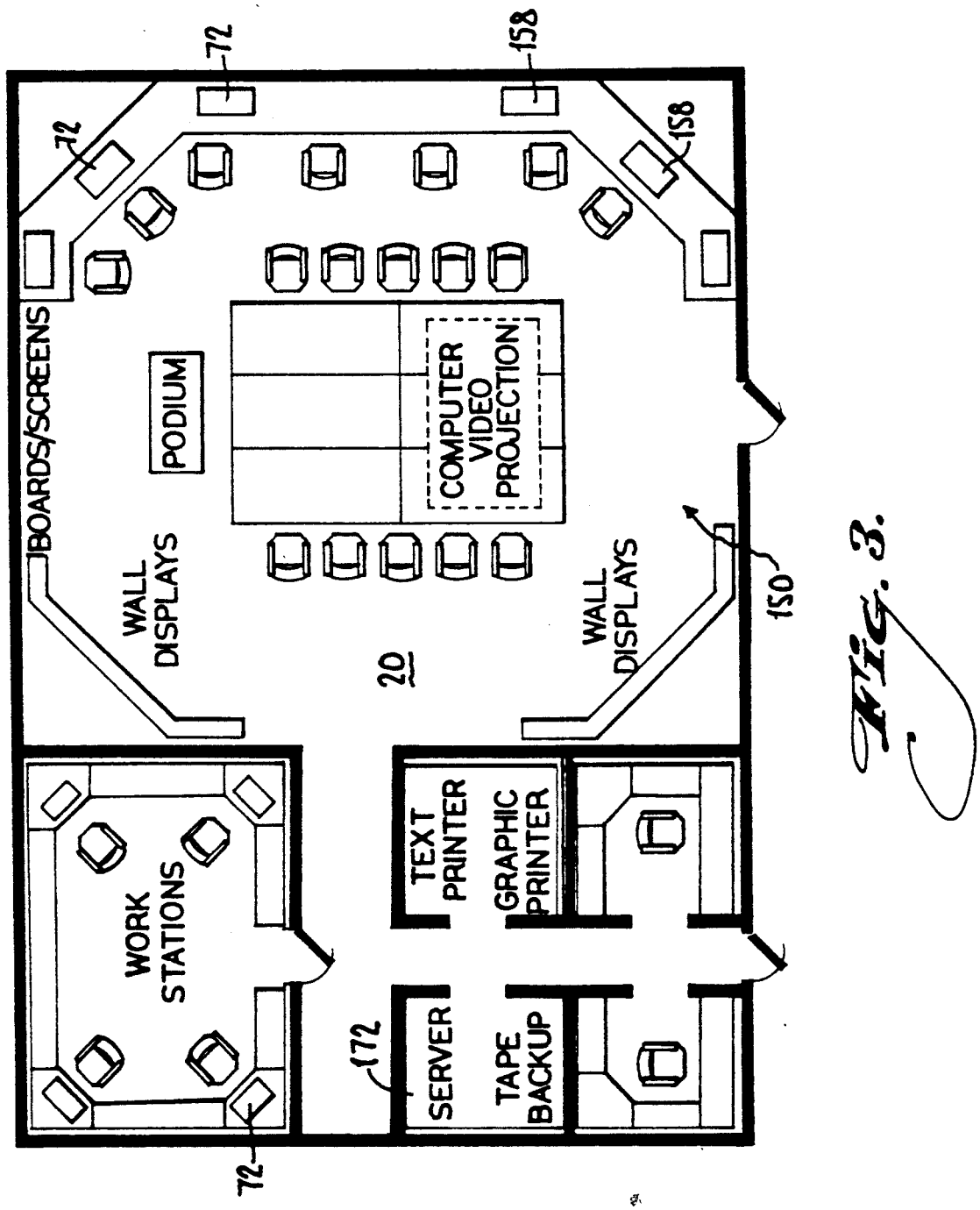
FIG. 3 is a plan view showing a layout for the data processing portions of the system.

The plant maintenance and diagnostic system can have a physical control center 150, as shown in FIG. 3, or the functions can be provided over a distributed network 154 as suggested by FIG. 4. An appropriate control center 150, for example, has a console 156 that displays current condition diagnoses, and has available recommendations and summary backup data. For increased flexibility, a distributed control embodiment includes individual terminals 158 (e.g., workstations or PC's) which can all access this data, or alternatively are devoted to analyzing specific degradations or diagnostics of specific components. Depending on need, certain networked stations can operate in a combination realtime and multi-tasking mode, in which data acquisition and report/diagnosis processing are divided into foreground and background processes. Certain such terminals can be set up to periodically process data, to process data on user demand, or to trigger processing based on the occurrence of some event.

A plant maintenance workstation 162 can also be located at or accessible as part of the plant maintenance and diagnostic system. Information developed from diagnostic functions is then used as a part of the overall plant maintenance planning and scheduling functions, as well as outage planning.

In data evaluation the specification of actual diagnostic calculations is undertaken, to provide the information required by plant decision makers. Factors affecting design of this part of the system include frequency of calculations to be performed, and the types of calculations themselves. For example, on demand requests for calculational updates may be appropriate for degradations that change slowly, such as fatigue accumulation. In other cases calculations may be run continuously, for example to assess the potentially rapid degradation of a piece of rotating equipment when oil flow is cut off.

Types of calculations can also vary widely. In some cases simple algorithmic calculations are performed on the input parameters directly; in others data transforms may be needed, either custom-made for a particular application, or with standard techniques such as various types of signal analysis. Finally, many diagnostic applications are well suited to artificial intelligence based calculational strategies, from simple rule-based methods for diagnosis of specific conditions, to more complex schemes based on neural networks typically applied to complex pattern recognition in signal analysis.

A comprehensive, functionally complete data acquisition capability for diagnostics and monitoring needs can rely in large part on the data obtainable from the plant process computer 170, shown in FIG. 8. The accessibility of this data for diagnostic purposes increases markedly when a plant computer upgrade, preferably using a data highway type setup, is implemented. With such an arrangement, it becomes possible to pass specific types of data at desired frequencies to numerous applications, simply by setting up a data transfer file and a node on the network. This eliminates difficulties in trying to access the signal output directly from the sensor, or trying to add a large number of wires to the process protection racks or plant computer, as had been done in the past. Such restrictions limited the potential applications and usability of the plant process computer data for uses other than operations and control.

Potential benefits of additional monitoring may justify the addition of sensors beyond the usual operational sensors in communication with the plant process computer. Data also may be needed at more frequent intervals than is typically provided for the plant process computer. In such cases, the number of containment penetrations available can become a limiting factor in the ability to add sensors. A highway concept as shown in FIGS. 2, 4 and 8 makes maximum use of existing sensors and decreases the need for adding containment penetrations. The sensors can be coupled to communicate directly with the PMDC 24 for use in diagnostic applications. In addition or instead, the raw analog signal data provided by the sensor 32, 50 can be processed, by such techniques as Fourier Analysis, and the resulting processed signal can be provided to the data highway.

Another method of data acquisition used at plants because of its cost effectiveness when data needs only to be obtained at infrequent intervals such as quarterly, or when conducting specific tests, is data obtained through portable analyzers. Previously, this data was manually transcribed for use in specific diagnostic and evaluative applications. With current technology, this data typically can be input directly to a computer disk, which can then be transferred automatically to a host computer 172 at the PMDC 24. The data and format are preferably standardized, so computer based application routines can be developed readily to utilize the data in diagnostic applications.

FIG. 4 shows a schematic of a preferred data processing layout for integrating diagnostics and monitoring over a monitoring data highway or network as described. This configuration is readily integrated with existing plant systems, and takes advantage of technology advancements in plant computer and data communication networks being implemented at many plants. The system can accept data both off-line and on-line. On-line data acquisition can occur either through the plant data highway or through smart devices that pre-process data (e.g., perform signal analysis) before sending the data over the system or plant data highway. The actual analyses are performed through a computer network distributed according to diagnostic function and located at the plant PMDC. In contrast to the plant control data highway, it would be possible to link these computers through a specific diagnostic data highway.

Preferably, the PMDC 24 is manned constantly during operation of the plant. In addition, communication capability exists to bring in various experts at the plant or utility headquarters. The outputs and displays of the PMDC, or selected subsets, can be provided to the various constituencies including engineering, scientific, maintenance, headquarters, or management for use in acting on diagnoses and recommendations. Short and long term data storage and retrieval capabilities are linked to the plant computer. Capability is also available to send selected diagnostic information over phone lines 174 or other data links, to other consultants or equipment vendors, to allow for rapid response and evaluation of critical conditions. Thus the D&M system itself is fully integrated into the total plant information system, and provides a means for plant people to function together effectively as a team to solve both short term difficulties, and to provide for long range planning to maximize efficiency of plant operation for life extension.

As applied to nuclear power generating plants, specific functional modules can be provided to address problems which are peculiar to such plants. Transient and fatigue monitoring is a first application. Operating transients cause thermal, pressure, and mechanical load fluctuations that contribute to fatigue accumulation in many pressure boundary components and systems over a plant operating period. Fatigue is considered in plant design through postulation and evaluation of specified number of occurrences of key normal and off-normal events, such as plant heatup, load changes, and reactor trips.

In the United States, nuclear power generation plants are required through their technical specifications to show continuing conformance of fatigue design and operation. Until recently, this was done by attempting to keep a log of the number of occurrences of certain of the design transients. This method has proved inadequate from design-operational conformance needs, because actual plant operating transients are different from design transients. Examples include thermal stratification that occurs in various places in horizontal piping, and additional at-power tests that cause fatigue. These are offset by the fact that many nuclear plants operate in a base load capacity, so events like load changes are fewer in number and less severe than may have been postulated in design and planning.

In addition to these considerations, to properly account for fatigue in justifying an extension of the predicted useful life of component structures or the plant as a whole, it is important to have as accurate a historical record of transients and fatigue over as much of the plant operation as possible. For these reasons, systems that automatically monitor plant process parameters and update fatigue on an ongoing basis are quite useful. In some cases it can be shown that the actual fatigue accumulation is less than predicted using design transients, even when accounting for the events not postulated in the original design. Additionally, the system according to the invention can help to identify and recommend operational changes to help slow the accumulation of fatigue.

The technology that makes automated fatigue monitoring practical and cost-effective is the Green's function based transfer function technology. This allows direct calculation of stress from available plant process parameters, without the need for repeated finite element calculations. Upon installing a transient and fatigue cycle monitoring systems in an operating plant, a review of records of past operating history is advisable. This information, along with plant design criteria, helps in selection of component regions to monitor for fatigue, and provides the means to establish an estimate of the fatigue accumulation up until the time of system installation, i.e., the fatigue baseline. This initial step also can provide insight into operating practices that may be enhanced to reduce the rate of transient and fatigue accumulation, and according to the invention the effectiveness of such operating practices can be monitored.

Another example specific to nuclear plant monitoring concerns monitoring the condition and performance of the reactor internals, as opposed to monitoring a particular mechanism (e.g., fatigue) that appears at various points throughout the plant system. In the case of reactor internals, the focus of data collection and analysis is a very specific component, or a part of a component, and the various degradation mechanisms and performance factors affecting it.

The reactor internals are of interest to at least two plant groups for different reasons. The reactor performance engineers are interested from the perspective of optimizing core life and fuel performance. The maintenance engineers are interested in the potential degradation mechanisms that affect the reactor internals such as loose parts, unwanted vibration, and material degradation. Both groups use similar input to make decisions, such as data from in-core temperature instrumentation, in-core and extra-core neutron flux detectors, loose parts accelerometers and other such process parameters, to evaluate current status. The performance engineers may use this data fairly frequently, e.g., to do on-line calculations of core performance. The maintenance engineers may analyze the data less frequently, and previously might take data manually only once per cycle for trend analysis. The integrated diagnostics and monitoring system of the invention provides information to both constituents through a common user interface utilizing a communication network.

Corrosion-erosion monitoring is another example of a system-wide degradation mechanism in nuclear power plants. It is tracked in at least two ways. Periodic wall thickness measurements can be taken at specific grid points on a component using a portable ultrasonic device. Permanent corrosion probes can be installed at strategic points in the system. The first approach monitors expected degradation and the second approach is used mainly in regions for which detailed information is desired about the corrosion process itself.

Turbine and generator diagnostics are a further example. In this case the requirements are again different from any of the previous examples. The turbine/generator arrangement is a high demand rotating machine that must reliably operate for months at a time. Failures can develop quickly, with potentially catastrophic consequences for the equipment, and may cause extended forced outages.

In such a case, the addition of sensors and monitoring devices can be easily cost-justified. The round-the-clock monitoring and evaluation capabilities of the invention are helpful to deal with failures that can develop quickly and unexpectedly. To monitor effectively under such conditions, the foregoing communication link back to the equipment vendor is useful, particularly where the vendor develops a diagnostic rule base and provides quasi-real time evaluation and diagnoses as needed. If several plants participate, all plants can benefit from ongoing enhancements to the diagnostic database with experience, and overall cost-effectiveness is increased.

FIG. 8 illustrates an architecture similar to that described above, applied specifically to a nuclear power generation plant and with the foregoing functional modules incorporated. Input comes from several real-time sources including the plant process computer and special application sensors, as well as through portable monitoring equipment. The sharing of common data between the various diagnostic modules is also illustrated. The individual diagnostic modules operate in modes ranging from on-demand to continuous real-time diagnostics, in two different locations including the PMDC and an off site location, and provide information on the plant information network to the plant people who need it.

The invention as described is especially adapted for production environments such as for nuclear plant diagnostics and monitoring. A wide range of other applications also are possible. Preferably, this wide range of diagnostic applications is based on flexible architecture, data acquisition, processing and display capabilities. An approach using a predictive maintenance and diagnostics center provides the flexibility, and a central focal point for effective use and integration of plant diagnostic capabilities.

The invention having been disclosed in connection with certain examples, a number of variations will now be apparent to persons skilled in the art. Whereas the invention is not intended to be limited to the embodiments disclosed as examples, reference should be made to the appended claims rather than the foregoing discussion of examples, in order to assess the scope of the invention in which exclusive rights are claimed.

We claim:

1. An integrated information system for a plant, the plant having a plurality of equipment units operating interactively in functional equipment subsets according to variable operational parameters, said equipment units being controllable for varying the operational parameters, and the operational parameters of at least some of the equipment subsets affecting loading of others of the equipment subsets, the information system comprising:

a plurality of sensors operatively coupled to the equipment units and sensing values of the operational parameters for assessing a condition of the equipment subsets;

sampling means coupled to the sensors, for collecting and generating at least one of sample values of the operational parameters and information including results of numerical operations on the sample values, and a memory means for storage thereof;

an operational control system coupled to at least one of the sampling means and the memory means, the operational control system being attended by an operator for adjusting the operational parameters during plant operation, the operational control system including diagnostic means for assessing plant operation based on the operational parameters and reporting on plant operation to the operator to enable choices for control of the equipment subsets to vary the operational parameters;

a maintenance monitoring system coupled to at least one of the sampling means and the memory means, the maintenance monitoring system being operable for accumulating a usage factor for a plurality of the equipment units and reporting maintenance requirements of the equipment units to maintenance personnel to enable choices for maintenance operations;

data communications means coupling the operational control system and the maintenance monitoring system for bidirectional communications and sharing of data;

wherein the memory means includes a data memory accessible over the data communications means to both said operational control system and said maintenance monitoring system, the data memory including diagnostic specifications for the operational parameters and technical specifications for the equipment subsets;

the diagnostic means assessing said plant operation as a function of the operational parameters and as a function of the usage factor, diagnostic specifications and technical specifications; and, the maintenance monitoring system reporting on the maintenance requirements of the equipment units as a function of the operational parameters and as a function of the usage factor, diagnostic specifications and technical specifications, and wherein data defining the operational parameters, the usage factor, the diagnostic specifications and the technical specifications are shared commonly between the operational control system and the maintenance monitoring system over the data communications means.

2. The integrated information system according to claim 1, wherein the plant is a nuclear power plant, and further comprising an automatic control system responsive to the operational control system.

3. The integrated information system according to claim 2, wherein the data communication means includes a remote communication capability.

4. The integrated information system according to claim 2, further comprising at least one engineering analysis system coupled over the data communication means, the engineering analysis system also accessing the data defining the operational parameters, the usage factor, the diagnostic specifications and the technical specifications, said data being shared commonly among the operational control system, the maintenance monitoring system and the engineering analysis system.

5. The integrated information system according to claim 4, wherein the sampling means comprises a plurality of data processing units coupled to at least one information bus, and wherein data from the information bus is coupled to the operational control system and the maintenance monitoring system.

6. The integrated information system according to claim 5, wherein a plurality of the sensors measure safety parameters and are coupled to the operational control system over a separate bus, and further comprising a bridge connection for data transfer between the information bus and the separate bus.

7. The integrated information system according to claim 6, wherein the information bus comprises a plurality of data paths accessible to the operational control system and the maintenance monitoring system, said data paths being arranged in a hierarchy, and further comprising a plurality of data analysis units coupled between the data paths for reducing data collected by the sensors.

* * * * *